United States Patent
Brosnan et al.

(10) Patent No.: US 6,229,616 B1
(45) Date of Patent: May 8, 2001

(54) HETERODYNE WAVEFRONT SENSOR

(75) Inventors: Stephen J. Brosnan, San Pedro; Donald G. Heflinger; Lee O. Heflinger, both of Torrance, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/283,604

(22) Filed: Apr. 1, 1999

(51) Int. Cl.$^7$ .................................................. G01B 9/02
(52) U.S. Cl. .................................................. 356/484
(58) Field of Search .................................. 356/349, 484

(56) References Cited

U.S. PATENT DOCUMENTS

| | | |
|---|---|---|
| 4,082,463 | 4/1978 | Dehait et al. . |
| 4,142,775 | 3/1979 | Ramaswamy . |
| 4,272,190 | 6/1981 | Shapiro . |
| 4,303,340 | 12/1981 | Hoffman . |
| 4,492,473 | 1/1985 | Richter et al. . |
| 4,636,630 | 1/1987 | NAgai . |
| 4,688,940 | 8/1987 | Sommargren et al. . |
| 4,865,454 * | 9/1989 | Lazzarini et al. ................ 356/359 |
| 5,276,636 * | 1/1994 | Cohn ................................... 364/822 |
| 5,414,646 | 5/1995 | Sanders et al. . |
| 5,448,361 | 9/1995 | Patton . |
| 5,678,465 | 10/1997 | Krumdieck . |
| 6,037,579 * | 3/2000 | Chan et al. ......................... 250/216 |
| 6,147,755 * | 11/2000 | Heflinger et al. ................. 356/349 |

* cited by examiner

Primary Examiner—Frank G. Font
Assistant Examiner—Phil S. Natividad
(74) Attorney, Agent, or Firm—Michael S. Yatsko; Robert W. Keller (57) ABSTRACT

An optical heterodyne wavefront sensor uses a radio frequency (RF) signal for measuring an optical wavefront having a state of phase that differs throughout its aperture. It comprises a lens, optical fiber and optical frequency shifter arrangement to develop a reference optical wavefront having substantially the same phase throughout and that is shifted in frequency by an amount corresponding to the RF. A beam combiner interferometrically combines the optical wavefront and the shifted reference optical wavefront into a heterodyne optical signal at the RF frequency, each subaperture of which has a phase that corresponds to the state of phase of a like subaperture of the optical wavefront. An array of lenses focuses the optical heterodyne signal into an array of photodetectors, each responsive to a subaperture and that produces an electrical signal at the optical beat frequency corresponding to the RF and having a phase corresponding to the state of phase of the corresponding subaperture of the optical wavefront. A plurality of circuit chains, each including a digital divider, responds to the RF signal and a corresponding one of the array of electrical signals and with an exclusive OR circuit and an integrating circuit develops a like plurality of output signals that comprise voltages that linearly correspond to the state of optical phase of a subaperture of the optical wavefront. The composite output signals represent the optical state of phase of the incoming optical wavefront.

13 Claims, 5 Drawing Sheets

HETERODYNE WAVEFRONT SENSOR

CROSS-REFERENCE TO RELATED APPLICATIONS

This application is related to the following commonly assigned applications: "A Dynamic Optical Micrometer", having inventors Donald Heflinger and Lee Heflinger; "A Dynamic Optical Phase State Detector", now U.S. Pat. No. 6,147,755, having inventors Donald Heflinger and Lee Heflinger; and "Improved High Average Power Fiber Laser System With High-Speed, Parallel Wavefront Sensor", having inventors Stephen Brosnan, Donald Heflinger, and Lee Heflinger; filed concurrently with this patent application.

BACKGROUND OF THE INVENTION

1. Field of the Invention

The present invention is generally related to optical heterodyne wavefront sensors, and more particularly to an optical heterodyne wavefront sensor that uses heterodyne interferometry to measure a two dimensional optical wavefront.

2. Description of the Prior Art

A conventional laser beam wavefront sensor responds to a two dimensional light beam and uses a camera to record an interferogram of the phase of the beam across its aperture. The phase information is used to correct aberrated beams, such as may occur when a light beam is propagated and steered through a long distance or through a turbulent atmosphere. The camera is usually read serially, and thus requires a relatively long period of time to produce a result. This is undesirable for high speed applications or for rapidly changing wavefronts.

An example of a heterodyne interferometer system is found in U.S. Pat. No. 4,688,940, "Heterodyne Interferometer System", invented by Gary E. Sommargren and Moshe Schaham. As disclosed, the heterodyne interferometer system utilizes a single stabilized frequency linearly polarized laser input beam from a light source. This is provided to an acousto-optic device along with a frequency stabilized electrical reference signal for transforming the input beam into a pair of orthogonally polarized beams. The beams differ in frequency by the reference signal frequency prior to providing the beams to a polarization type interferometer. A mixing polarizer mixes the beams after they traverse the interferometer and provides the mixed beams to a photo-electric detector where they are processed into an electrical measurement signal. The electrical measurement signal is processed in a phase meter/accumulator along with the reference signal to produce an output signal which is the sum of the single resultant phase difference on a cycle-by-cycle basis between the measurement signal and the reference signal. The phase meter/accumulator includes an analog-to-digital converter and a memory register for the previous cycle, with the measurement resolution being determined by the number of bits of the analog-to-digital converter. The system, however, does not measure the phase of an entire field or serve to correct the individual phase differences of the array of subapertures that constitute the aberrated beam, such as one which has propagated through a turbulent environment where the phase of each subaperture across the beam varies.

What is needed, therefore, is an optical heterodyne wavefront sensor that is capable of simultaneously measuring the phase of each subaperture across an optical wavefront, that allows two dimensional measurements of the state of phase of the wavefront in parallel, and that is capable of measuring the optical phases of more than one wavelength.

SUMMARY OF THE INVENTION

The preceding and other shortcomings of the prior art are addressed and overcome by the present invention which provides generally an optical heterodyne wavefront sensor.

Briefly the optical heterodyne wavefront sensor uses a radio frequency (RF) signal for measuring an optical wavefront having a state of phase that differs throughout its aperture. It comprises a lens, optical fiber and optical frequency shifter arrangement to develop a reference optical wavefront having substantially the same phase throughout and that is shifted in frequency by an amount corresponding to the RF. A beam combiner interferometrically combines the optical wavefront and the shifted reference optical wavefront into a heterodyne optical signal at the RF frequency, each subaperture of which has a phase that corresponds to the state of phase of a like subaperture of the optical wavefront. An array of lenses focuses the optical heterodyne signal into an array of photodetectors, each responsive to a subaperture and that produces an electrical signal at the optical beat frequency corresponding to the RF and having a phase corresponding to the state of phase of the corresponding subaperture of the optical wavefront. A plurality of circuit chains, each including a digital divider, responds to the RF signal and a corresponding one of the array of electrical signals and with an exclusive OR circuit and an integrating circuit develops a like plurality of output signals that comprise voltages that linearly correspond to the state of optical phase of a subaperture of the optical wavefront. The composite output signals represent the optical state of phase of the incoming optical wavefront.

The foregoing and additional features and advantages of this invention will become apparent from the detailed description and accompanying drawing figures. below. In the figures and the written description, numerals indicate the various elements of the invention, like numerals referring to like elements throughout the drawing figures and the written description.

DETAILED DESCRIPTION OF THE PREFERRED EMBODIMENTS

Figure 1:
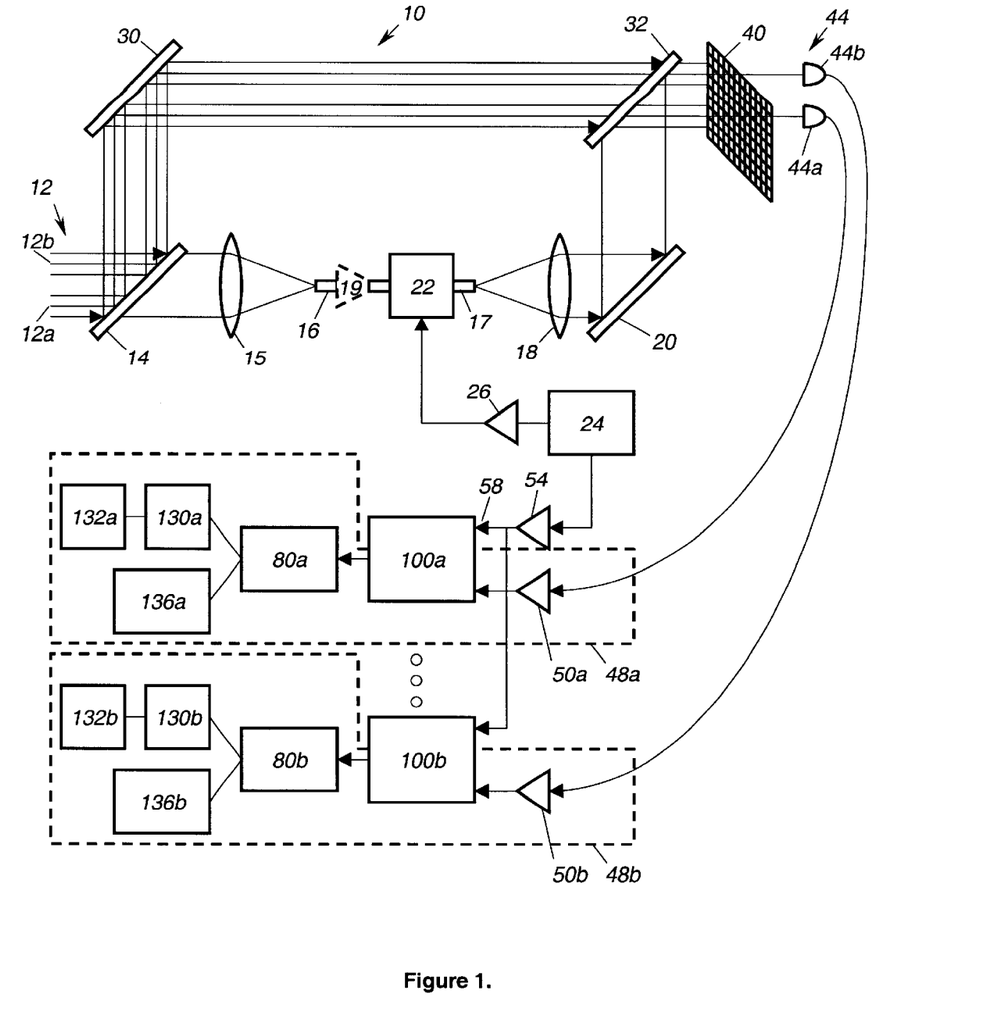
FIG. 1 is a schematic block diagram of the optical heterodyne wavefront sensor in accordance with the present invention.

As illustrated in the schematic block diagram of FIG. 1, the present invention provides an optical heterodyne wavefront sensor, generally designated by the numeral 10. As will be described the optical heterodyne wavefront sensor 10 produces a plurality of linear voltage signals, each corresponding to the state of phase of a subaperture of an optical wavefront to be measured. This state of phase is also referred to as a particular wavefront state.

In the optical heterodyne wavefront sensor 10, the optical wavefront 12 is a two dimensional wavefront including N by N subapertures, two of which are represented by the numerals 12a and 12b. In certain applications the wavefront is an aberrated beam with a phase distorted wavefront, such as one that has propagated a long distance through a turbulent atmosphere. Consequently, its state of phase varies dramatically across its aperture, with the state of phase of its subapertures differing by more than a wavelength.

A beam splitter 14 conducts some portion of the light in the wavefront 12 to the sample area of the interferometer. Some or all of the transmitted wavefront is focused by lens 15 to a pinhole size beam onto the core of a single mode optical fiber 16. The fraction of the light that is coupled into the fiber 16 has a phase that is uniform across its cross-section and is directed to an optical frequency shifter 22. A radio frequency (RF) oscillator 24 generates an RF fixed frequency electrical signal which is applied through an amplifier or RF driver 26 to the optical frequency shifter 22. Preferably, the RF signal is a sinusoidal signal at 40 MHz, but any fixed RF frequency may be utilized. The optical frequency shifter 22 serves to shift the optical frequency of the optical reference optical wavefront by an amount of frequency corresponding to the RF. In one embodiment it can be an optical modulator such as a Mach-Zehnder modulator followed by a narrow pass band optical filter. For Mach-Zehnder modulators the RF signal can have a frequency of 40 GHz. In the preferred embodiment, the optical frequency shifter 22 is an acousto-optic modulator. In such modulators, the optical reference wavefront or beam is shifted in optical frequency by the RF modulation frequency and is directed at a Bragg diffraction angle and coupled to an optical fiber 17. The optical frequency shifter 22 also produces a zero order unshifted beam, but this is not used in this embodiment. The optical fiber 17 carries the shifted reference beam to its open end 17 where such beam is radiated and expanded outwardly to a collimating lens 18. Thus, a plane wave reference beam that has a uniform phase across its two dimensional aperture and is shifted in frequency by an amount corresponding to the RF is developed. The uniform phase is referred to as the state of phase of the reference wavefront. If needed, a laser amplifier, shown in dashed lines and indicated by the numeral 19, is used to amplify the beam in the reference arm of the optical elements forming an interferometer to enable a high interferometer contrast ratio.

A reflector 20 reflects the reference wavefront onto a beam combiner 32. The remainder of the incoming optical wavefront 12 is directed by the beam splitter 14 onto a reflector 30 which serves to reflect the optical wavefront to the beam combiner 32. The beam combiner 32 combines the light from the frequency upshifted reference wavefront and the frequency unshifted phase distorted optical wavefront so that the optical interference between the wavefronts performs a heterodyne of these two optical frequencies, which generates a heterodyne optical signal at the beat frequency representative of the RF modulation frequency from the RF oscillator 24.

A lens array 40 is disposed to focus the heterodyned optical signal. The array has dimensions of N×N. Each lens corresponds to a subaperture of the incoming optical wavefront with the subapertures 12a and 12b being shown in FIG. 1. Thus the N by N lenses each correspond to a pixel of the incoming optical wavefront.

An array of photodetectors 44, also having N×N dimensions is disposed proximate the lens array 40. Each photodetector in the array responds to the intensity variations of the corresponding subaperture of the heterodyned optical signal, thereby generating the sinusoidal RF beat frequency signal. This is applied to N×N paths 48. For simplicity, only paths 48a and 48b are shown in dashed lines. Elements in the respective paths bear the letters a or b, whereas the following text generally does not include the letter when depicting one of the elements. There is a path for each pixel. Thus, for the N×N pixels there are N×N paths. The phase of each of the detected RF beat frequencies relative to the original RF modulation signal contains the phase information of the corresponding subaperture of the incoming optical wavefront.

Each of the paths or chains 48 includes an amplifier 50 which serves to amplify the detected RF beat frequency signal to a sinusoid at a preselected amplitude.

The RF oscillator 24 also has its output connected to an amplifier 54 for appropriately amplifying or attenuating the amplitude of the RF modulator signal for supplying the reference RF signal to a reference path or chain 58. The function of amplifier 54 may be designed into the amplifier 26. A heterodyne signal processor 100 contains the paths 48 and 58, and serves to transform the sinusoidal waveforms from the RF frequency reference oscillator 24 and from each of the respective N×N sinusoidal photodetectors 44 into N×N pulse trains whose respective duty cycles are proportional to the sampled optical phase. A more detailed description of the heterodyne signal processor will follow. The duty-cycle pulse trains are electronically integrated by low pass filters 80 which after some time develop DC voltages that are proportional to the N×N duty cycles and consequently to the sampled N×N optical phase.

The heterodyne signal processor 100 may be fabricated in a number of ways. One embodiment is shown in the circuit block diagram of FIG. 2. The path 48 includes a Schmidt trigger 90 that converts the sinusoid from the photodetector 44 into a square wave pattern at the RF beat frequency at its respective output 94.

Figure 2:
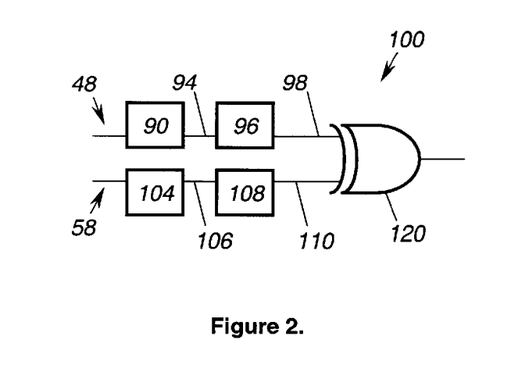
FIG. 2 is a schematic block diagram of an embodiment of the heterodyne signal processor of the wavefront sensor.

The square wave signal is provided to a digital divider 96 that creates at its output 98 a square wave that is lower in frequency by an integer factor M. Mathematically, the square wave frequency is f/M. The division factor must be identical for all dividers in the system. In a preferred embodiment M is a power of 2 (e.g. 2, 4, 8, 16, ... ). Such factors are preferred because such integrated circuit devices are readily available, such as those manufactured by Fairchild Corporation and designated as Model 74F74.

Similarly the reference path 58 contains elements that are similar in structure and function to the elements in path 48. More particularly, it includes a Schmidt trigger 104 for converting the sinusoidal RF signal into a square-wave pulse train at the same frequency on its output 106. A digital divider 108 that divides by the factor M creates at its output 110 a square wave that is lower in frequency by the factor M used in all the digital dividers. Hence the division converts a pulse train with period 1/f into a pulse train with period M/f.

Figure 3:
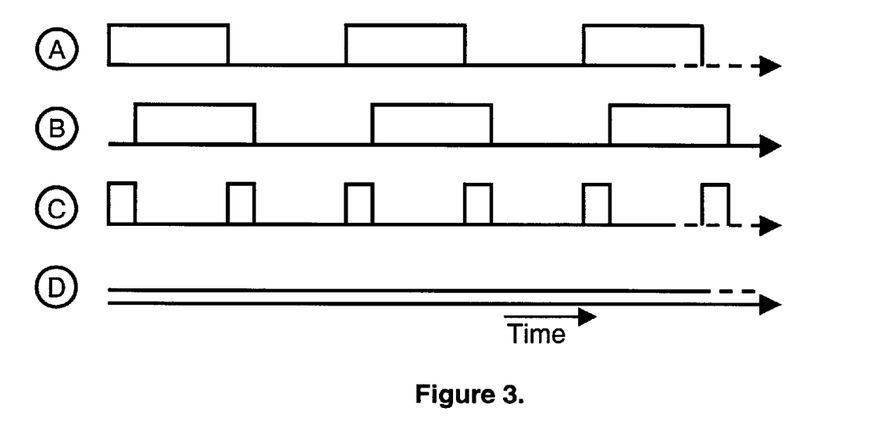
FIG. 3 is a timing diagram illustrating the waveforms developed for one subaperture of the wavefront at several circuit elements in the heterodyne signal processor illustrated in FIG. 2.

With reference now to FIG. 3 timing diagrams are shown for the heterodyned detected digital-divided square wave signal RF appearing at the output 98 and the reference digital-divided square wave RF signal appearing at output 110 as they are processed through an exclusive-OR circuit 120. More particularly, the offset is shown by the displacement in the transitions in the timing diagram between the signal at output 110 at FIG. 3A, which is the divided signal applied by the reference RF modulation signal, and the signal at output 98 at FIG. 3B, which is the divided square wave signal from the phase varying optical wavefront beat frequency. As illustrated one period of the square waves shown in FIGS. 3A and 3B is M/f. The divided reference RF modulation square wave signal is applied to an input of each of the N×N exclusive OR (XOR) gates 120. When these sample pulse train to square wave signals from one of the N×N paths in one chain are combined with the reference pulse train by an exclusive OR gate 120 it produces a pulse train shown by the signal at FIG. 3C, with a duty cycle that is proportional to the respective sampled optical phase in the subaperture of the array. This duty cycle is then sent through the low pass filter 80 that develops a constant DC voltage over time on its output as shown in FIG. 3D, having a magnitude that is dependent on the duty cycle. Preferably, the filter 80 is a conventional resistor capacitor integrator circuit whose time constant (1) must be much greater than the period of the RF square waves, M/f, and (2) must be less than the desired time transitions of the optical phase being measured.

Figure 4:
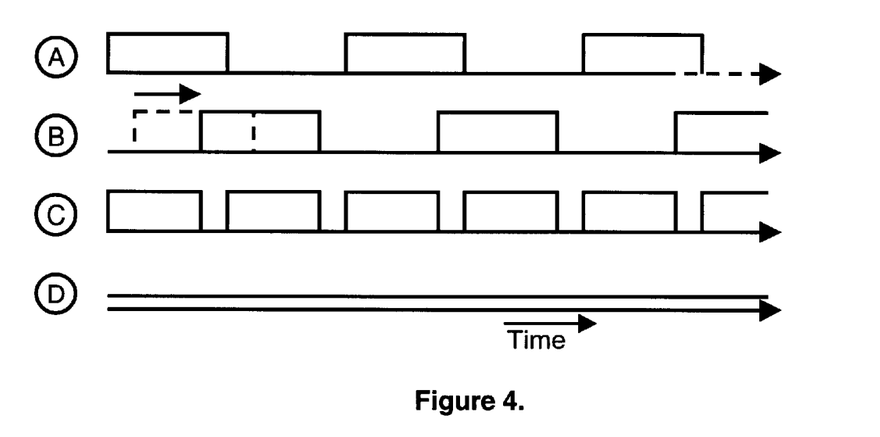
FIG. 4 is a timing diagram similar to FIG. 3 illustrating the waveforms developed after the state of phase of the optical wavefront has been changed.
Figure 7:
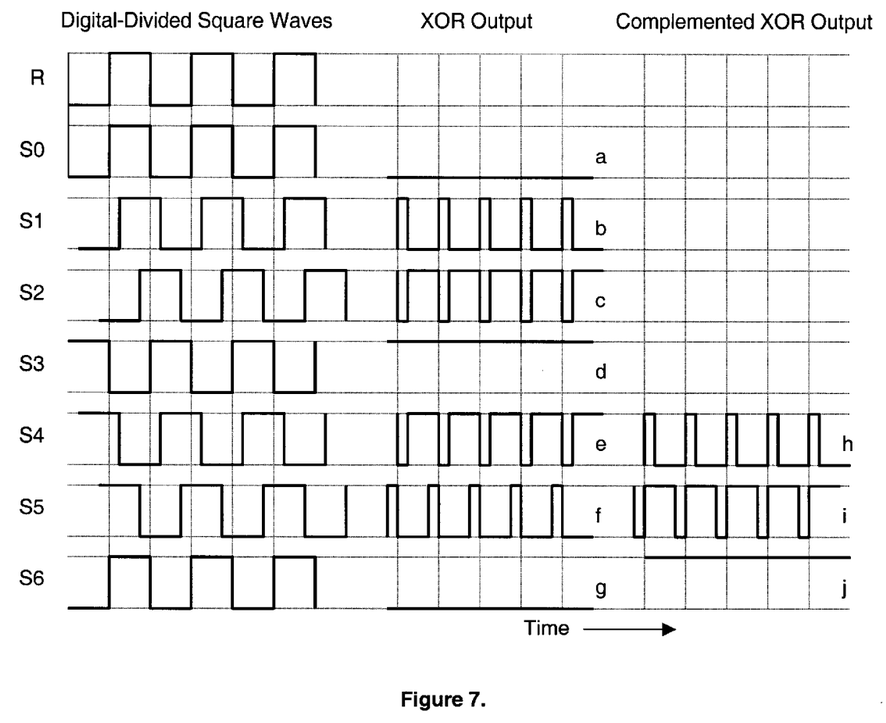
FIG. 7 is a timing diagram illustrating the waveforms developed at various elements within the embodiment illustrated in FIG. 2 and in FIG. 6.

As shown in FIG. 4, new waveforms are created as the optical phase changes at each pixel and hence the elements in the N×N paths 48 and the path 58 as a new interference pattern is developed. This results in the square wave signal at FIG. 4B being developed by the digital divider 96 on its output 98. As shown by the arrow the signal is displaced relative to the signal at FIG. 4A (and also to the signal shown in FIG. 3B as illustrated by the dashed lines) and corresponds to the phase change in the apertures due to successive incoming optical wavefronts. This leads to a new pulse train at the output of each of the N×N exclusive OR gates 120 with an increased duty cycle as shown by the signal at FIG. 4C. Also, FIG. 7 shows timing diagrams for the heterodyned detected RF beat frequency electrical signal appearing at the output 110 of element 108 as they are processed through exclusive-OR 120. The left column shows the reference digital-divided RF square-wave signal in FIG. 7. In subsequent views in FIG. 7, labeled S0, S1, S2, S3, S4, S5, and S6, the signal digital-divided square-waves are shown for increasing values of relative phase. The second column shows the corresponding duty-cycle pulse train waveform at the output of the exclusive-OR 120. Note that the signal square wave slips to the right as the phase is increased. The duty-cycle of the waveform in the second column grows linearly as the phase increases from 0 to Mπ in the progression from FIGS. 7 S0 to S3, where the maximum (equaling 1) duty cycle is reached. As the phase continues to increase from Mπ to 2Mπ during the sequence S4 to S6 the duty cycle decreases linearly from the maximum to zero. The trend is shown explicitly in the triangular response curve of FIG. 5, where the letter labels shown for waveforms in the second column of FIG. 7 also designate points on the response curve of FIG. 5.

Figure 5:
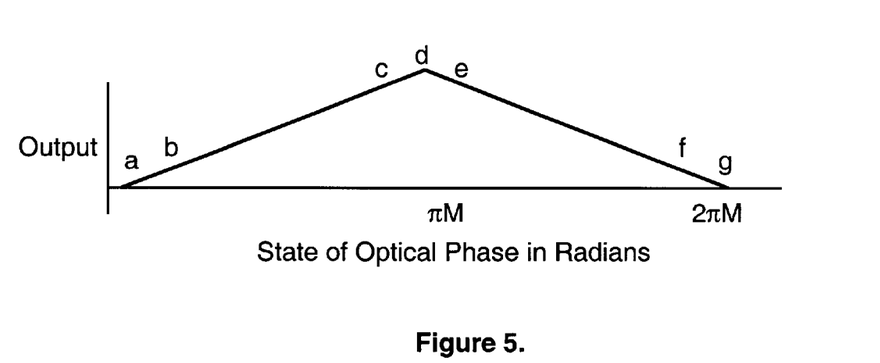
FIG. 5 is a plot of voltage versus state of phase representing the output signal produced using the heterodyne signal processor illustrated in FIG. 2.

The increased duty cycle creates a larger DC voltage at the output of the low pass filter 80 as shown in FIG. 4D that has a linear dependence on the actual phase change. Note that the resulting wave form of voltage versus the state of optical phase follows a repeating linear triangular wave form that spans several optical wavelengths as shown in FIG. 5. Note that in FIG. 5 the independent variable is the state of optical phase in radians not time as shown in FIGS. 3 and 4 and that the voltage increases linearly from a minimum to a maximum when the state of optical phase is changed by πM radians, where M is the integer used in the divide chains 48 and 58.

The change in state of phase can be directly read from the magnitude of the DC voltage. It should be recognized that the collection of N×N voltages as output signals reflects the particular state of the wavefront phase for all the photodetector positions in the photodetector array 44. It is the collection of voltages that represent the output of the optical wavefront sensor 10.

The output of each integrator filter 80 may be applied to a phase modulator driver 130 and is available for correcting the state of phase associated with the subaperture of the succeeding optical wavefront. The phase modulator driver 130 is used to drive a phase modulator 132. The phase modulator 132 is a linear optical device comprising an electro-optic medium having a refractive index that depends linearly on the voltage applied across it. Thus, the refractive index of the optical medium is dynamically changed according to the applied voltage signal from the driver 130. When the refractive index of the optical medium is changed, the optical path length is changed and this causes a change in the relative optical phase of the light delivered by the phase modulator 132 (relative refers to the state of the phase at the output with an applied voltage compared to the state of the phase at the output when no voltage is applied).

Accordingly, the phase modulator driver 130 linearly effects the state of the optical phase of the light from the phase modulator 132. By changing the optical path length it produces a linear phase modulated beam. In one application such a light beam can be passed through the distorting atmosphere so that an undistorted beam will be incident on a target.

For fast dynamic records or measurements of the particular wavefront state, the plurality of N×N voltages can be displayed on a display such as an oscilloscope or a computer 136. The display of a computer 136 can be configured to display either the linear voltages versus time or the relative state of phase of all subapertures in the form of a false color or grayscale image. The computer 136 also serves to record or print out the displayed information.

Figure 8:
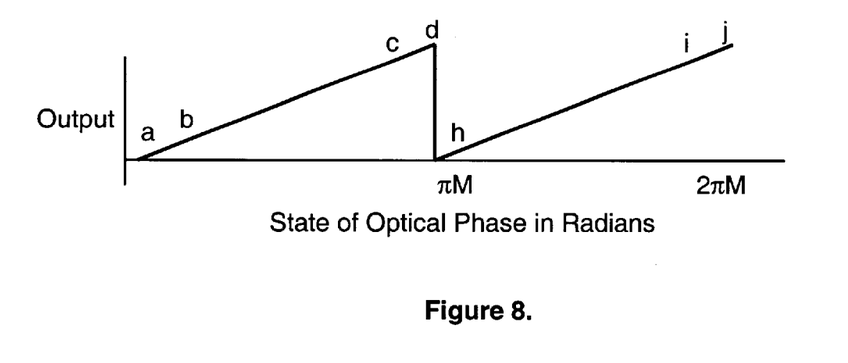
FIG. 8 is a plot of voltage versus state of phase representing the output signal produced using the heterodyne signal processor illustrated in FIG. 6.

The voltage response, illustrated in FIG. 5 versus optical phase is of triangular form. This, however, may be not suited to certain applications such as the measurement of beam distortion after propagating through the atmosphere. For this purpose only 2π radians of optical phase are needed to allow phase correction for propagation. Therefore, any phase correction should be modulo 2π. This means that the preferred voltage response versus measured optical phase has a sawtooth form as illustrated in FIG. 8.

Figure 6:
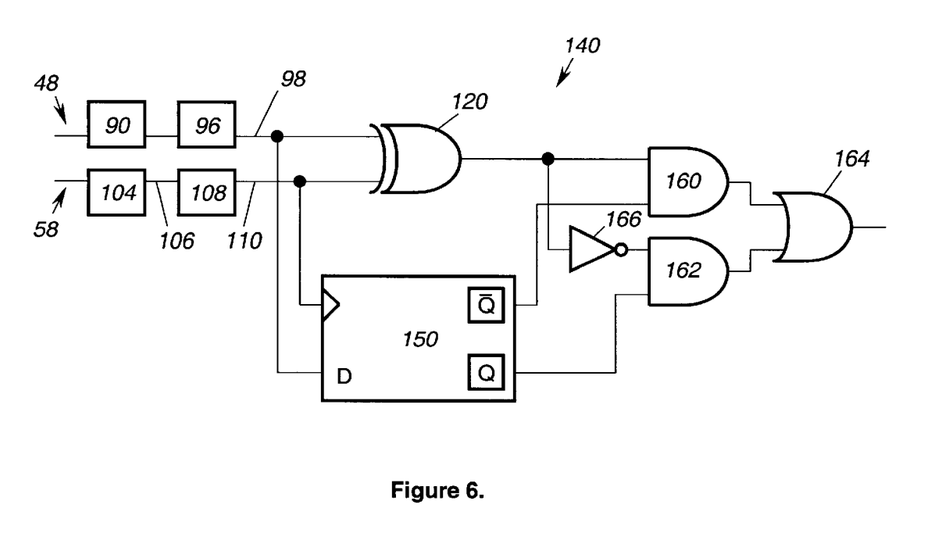
FIG. 6 is a schematic block diagram of another embodiment of the heterodyne signal processor of the wavefront sensor.

With reference now to FIG. 6, a schematic diagram is illustrated for another embodiment of the heterodyne signal processor 140. The heterodyne signal processor 140 is similar to the heterodyne signal processor 100, but includes the addition of a choice of either the original duty-cycle waveform or its complement. For simplicity like elements of the processor 140 are given the same numerals used in describing the processor 100. A decision circuit 150, is added to test whether the sample phase is in the range from 0 to Mπ radians, or the range from Mπ to 2Mπ, where M is the integer digital division factor. In the first range the original duty-cycle waveform is chosen. In the second range the complement waveform is chosen.

The timing diagrams shown in FIG. 7 demonstrate the operation. FIG. 7R shows the reference pulse train, and the subsequent FIGS. 7S0 through 7S6, each having three columns, show a sequence of sample pulse trains corresponding to phase as it increases from 0 to 2Mπ. The first column of FIGS. 7S0 through 7S6 shows the heterodyne pulse trains. The second or middle column shows the original duty-cycle pulse trains. The third or right hand column shows the complement duty-cycle pulse trains. This is for the complemented XOR waveforms for the signal sequence S4 to S6, corresponding to the signal phase range Mπ to 2Mπ. Note that the processor 140 chooses the waveform from the second column when the sample phase is in the range from 0 to Mπ and from the third column when the sample pulse is in the rang from Mπ to 2Mπ. Due to the decision circuit 150, the complemented XOR duty-cycle waveform is chosen in this case and the output duty-cycle waveform as the phase is changed from 0 to 2Mπ follows the progression of curves labeled a, b, c, d, h, i, and j. These labels show the corresponding points on the response curve shown in FIG. 8. As has been described the response curve is the output of the integer 68. Hence, the curve has the desired sawtooth shape, thereby assuring that the phase response of the sensor be modulo 2π.

The circuit shown in FIG. 6 is similar to that in FIG. 2. The Schmidt triggers 90 and 104, digital dividers 96 and 108, and exclusive-OR 120 elements are the same. A decision circuit 150 is added in the form of a conventional edge-triggered D flip-flop. The reference pulse train from 110 is fed to the clock input. At each positive transition of the clock the state of the sample pulse train from output 98 is latched (see FIG. 7). If the sample is low at the time of the clock edge then the sample phase is in the range 0 to Mπ, and the Q and complement Qbar outputs are set to select the original duty-cycle pulse train. The selection is made through the AND gates 160 and 162 and OR gate 164. Conversely, if the sample is high at the time of the clock edge, then the sample is in the range Mπ to 2Mπ, and the Q and Qbar outputs are set to select the complemented duty-cycle pulse train which is provided by the inverter 166.

Accordingly the present invention provides a plurality of linear voltage signals for each subaperture that in the composite represents the two dimensional optical state of phase of the optical wavefront. It provides these voltages even when the phase differs by more than one optical wave. The parallel outputs signals allow very fast measurement speed, e.g. 10 KHz frame rates. Thus, the invention provides fast, parallel, multi-beam, phasefront measurements.

Obviously, many modifications and variations of the present invention are possible in view of the above teachings. Thus, it is to be understood that, within the scope of the appended claims, the invention may be practiced otherwise than as specifically described above.

What is claimed is:

1. A heterodyne wavefront sensor for measuring an optical wavefront having a state phase that differs throughout its aperture and that uses a radio frequency (RF) signal comprising:

means responsive to the optical wavefront and the RF signal and operative to develop a reference optical wavefront having substantially the same phase throughout and that is shifted in frequency by an amount corresponding to the RF;

interferometer means responsive to said optical wavefront and said shifted reference optical wavefront and operative to interferometrically combine the wavefronts into a heterodyne optical signal at the RF frequency, each subaperture of which has a phase that corresponds to the state of phase of a like subaperture of the optical wavefront;

an array of elements, each responsive to a subaperture of said heterodyne optical signal and operative to produce an electrical signal at the optical beat frequency corresponding to the RF and having a phase corresponding to the state of phase of the corresponding subaperture of the optical wavefront; and means responsive to the RF signal and said array of electrical signals and operative to develop a plurality of output signals, each corresponding to the state of optical phase of a subaperture of the optical wavefront.

2. The heterodyne wavefront sensor as set forth in claim 1, wherein each of said plurality of output signals has a magnitude that varies linearly relative to the state of optical phase of its corresponding subaperture.

3. The heterodyne wavefront sensor as set forth in claim 1, wherein said means responsive to said RF signal and said electrical signal includes a first digital divider and a second digital divider, said digital dividers serving to divide the RF frequency of said RF signal and said electrical signal respectively, and circuit means responsive to the divided RF signal and the divided electrical signal and operative to produce one of said output signals.

4. The heterodyne wavefront sensor as set forth in claim 3, wherein said digital dividers serve to divide the RF frequency of said RF signal and said electrical signal by M, where M is any integer.

5. The heterodyne wavefront sensor as set forth in claim 3, wherein said circuit means includes an exclusive OR gate for providing a pulse train having a duty cycle that reflects the relative phase between the divided RF signal and the divided electrical signal and a filter circuit for developing one of said output signals.

6. The heterodyne wavefront sensor as set forth in claim 5, and further comprising means responsive to said filter circuit for displaying the output signal.

7. The heterodyne wavefront sensor as set forth in claim 3, wherein said means responsive to said RF signal and said electrical signal includes a first means for converting said RF signal into a first square wave pulse train and for applying said first square wave pulse train to said first digital divider and a second means for converting said electrical signal into a second square wave pulse train and for applying said second square wave pulse train to said second digital divider.

8. The heterodyne wavefront sensor as set forth in claim 3, wherein said output signal has an increasing magnitude over the state of optical phase up to the product of π radians and the divisor of the said digital dividers.

9. The heterodyne wavefront sensor as set forth in claim 1, and further comprising means for generating said RF signal.

10. The heterodyne wavefront sensor as set forth in claim 5 and further comprising a phase modulator for developing a phase-correcting signal from a respective output signal.

11. The heterodyne wavefront sensor as set forth in claim 1 wherein said means response to the optical wavefront includes a lens for focusing the optical wavefront to a pinhole size beam, and optical fiber for carrying the pinhole size beam, an optical frequency shifter responsive to the RF signal and the pinhole size beam and operative to shift the frequency of the pinhole size beam by an amount of frequency corresponding to the RF, and means for expanding the frequency-shifted beam to said reference optical wavefront that has uniform phase across its aperture.

12. A heterodyne wavefront sensor as set forth in claim 5, and further comprising a decision circuit coupled across said exclusive OR gate for producing a complementary pulse train when the state of optical phase is in the range from $M\pi$ to $2M\pi$ radians, where M is the integer digital divider factor.

13. A heterodyne wavefront sensor as set forth in claim 12, wherein said output signals each have a sawtooth waveform.

* * * * *